(12) United States Patent
Furuya (10) Patent No.: US 6,428,722 B1
(45) Date of Patent: Aug. 6, 2002

(54) GAS DIFFUSION ELECTRODE MATERIAL, PROCESS FOR PRODUCING THE SAME, AND PROCESS FOR PRODUCING GAS DIFFUSION ELECTRODE

(75) Inventor: Nagakazu Furuya, 6-24-604, Kitaguchi 1-chome, Kofu-shi, Yamanashi 400-0024 (JP)

(73) Assignees: Nagakazu Furuya, Yamanashi; Toagosei Co., Ltd., Tokyo; Mitsui Chemicals, Inc., Tokyo; Kaneka Corporation, Osaka, all of (JP)

(*) Notice: Subject to any disclaimer, the term of this patent is extended or adjusted under 35 U.S.C. 154(b) by 0 days.

(21) Appl. No.: 09/600,114

(22) PCT Filed: Jun. 28, 1999

(86) PCT No.: PCT/JP99/03440

§ 371 (c)(1),
(2), (4) Date: Jul. 12, 2000

(87) PCT Pub. No.: WO00/29643

PCT Pub. Date: May 25, 2000

(30) Foreign Application Priority Data

Nov. 12, 1998 (JP) ............................................ 10-322286
Feb. 1, 1999 (JP) ............................................ 11-024164
Mar. 31, 1999 (JP) ............................................ 11-093097

(51) Int. Cl.[7] ............................ H01B 1/04; H01B 1/12; B05D 1/02
(52) U.S. Cl. ....................... 252/510; 427/115; 427/426; 423/449.2; 429/42
(58) Field of Search .............................. 427/115, 126.1, 427/201, 376.1, 387, 421, 426; 428/421; 423/449.2; 429/42; 252/510

(56) References Cited

U.S. PATENT DOCUMENTS 4,299,682 A * 11/1981 Oda et al. .................... 204/265
4,377,496 A * 3/1983 Solomon ................... 252/425.3
4,659,528 A * 4/1987 Plowman et al. ............. 264/49
5,501,915 A * 3/1996 Hards et al. .................. 429/42
5,746,896 A * 5/1998 Shimamune et al. ........ 204/284
5,776,539 A * 7/1998 Watanabe et al. ............ 427/113

FOREIGN PATENT DOCUMENTS

| JP | 2-54790 | 2/1990 |
| JP | 07-282814 | 10/1995 |
| JP | 9-41181 | 2/1997 |
| JP | 9-41181 A * | 2/1997 |

* cited by examiner

Primary Examiner—Michael Barr
(74) Attorney, Agent, or Firm—Young & Thompson (57) ABSTRACT

A reaction layer material for a gas diffusion electrode and a production process therefor, which is obtained by mixing a polytetrafluoroethylene dispersion with a surfactant-containing aqueous solution containing hydrophilic fine particles and a hydrophobic carbon black, each dispersed therein satisfying the relationships: $0.5<D<2$ and $r_s<2r_p$, wherein $D=r_c/r_p$, $r_s$ represents the average particle diameter of the hydrophilic fine particles dispersed in the surfactant-containing aqueous solution, $r_c$ represents the average particle diameter of the hydrophobic carbon black dispersed in the surfactant-containing aqueous solution, and $r_p$ represents the average particle diameter of polytetrafluoroethylene fine particles in the polytetrafluoroethylene dispersion to be used; and then adding a self-organizing agent to the mixture and mixing therewith. A jet mill is used for dispersing the hydrophobic carbon black. The liquid obtained by adding and mixing the self-organizing agent is spray-dried or is applied by spraying.

6 Claims, 1 Drawing Sheet

GAS DIFFUSION ELECTRODE MATERIAL, PROCESS FOR PRODUCING THE SAME, AND PROCESS FOR PRODUCING GAS DIFFUSION ELECTRODE

TECHNICAL FIELD

The present invention relates to a material for a gas diffusion electrode for use in electrolysis of alkali chloride solutions or in fuel cells, etc., a process for producing the same, and a process for producing a gas diffusion electrode.

BACKGROUND ART

A gas diffusion electrode generally has a structure comprising a gas feed layer and a reaction layer, and applications thereof include fuel cells, the electrolysis of alkali chloride solutions, etc.

In the electrolysis of an alkali chloride solution by the ion-exchange membrane method, a gas diffusion electrode is used as an oxygen cathode.

Electrolysis by the ion-exchange membrane method is usually conducted in an electrolytic cell partitioned into an anode chamber and a cathode chamber with an ion-exchange membrane which is a cation-exchange membrane. In this electrolytic cell, the anode chamber having an anode contains an aqueous sodium chloride solution, while the cathode chamber having a cathode contains an aqueous caustic soda solution. Among such cells, electrolytic cells of the type employing a gas diffusion electrode as the cathode have a structure whose cathode part comprises: a catholyte chamber ranging from an ion-exchange membrane to the gas diffusion electrode and containing an aqueous caustic soda solution; the gas diffusion electrode, which comprises a reaction layer and a gas feed layer; and an oxygen gas chamber.

Electrolytic cells having such constitution have an advantage that when a current is permitted to flow through the two electrodes, i.e., the anode and the gas diffusion electrode of the cathode part, to conduct electrolysis, then an oxygen-reducing reaction takes place on the gas diffusion electrode to elevate the cathode potential and, as a result, the electrolytic voltage is considerably reduced.

Gas diffusion electrodes generally have a structure comprising a reaction layer and a gas feed layer. In the case of producing a gas diffusion electrode having a reaction layer comprising fine silver particles, a hydrophobic carbon black, and polytetrafluoroethylene (hereinafter sometimes referred to as "PTFE"), the hydrophobic carbon black used for this gas diffusion electrode has particle sizes of from 20 to 300 $\mu$m due to secondary aggregation, although the diameters of the primary particles are about 0.05 $\mu$m.

In producing a high-performance electrode, a technique is used in which a carbon black having a reduced particle size is employed to thereby form a larger amount of three-phase zone interfaces.

Incidentally, in a conventional process, the reaction layer of a gas diffusion electrode has been produced by dispersing a hydrophilic carbon black with the aid of a surfactant, mixing a PTFE dispersion therewith, freezing the resultant mixture, dispersing a hydrophobic carbon black with the aid of a surfactant, mixing a PTFE dispersion therewith, freezing the resultant mixture, thawing the two frozen mixtures, and mixing the thawed mixtures together. In this process, the carbon blacks and the PTFE dispersion undergo aggregation through the freezing and thawing operations to thereby form hydrophilic aggregates and hydrophobic aggregates. The two kinds of aggregates are mixed together to obtain a mixture of fine hydrophilic parts and fine hydrophobic parts which serves as a reaction layer material.

However, since such a conventional process for producing the reaction layer of a gas diffusion electrode requires a prolonged time period for the freezing and thawing operations for aggregating a PTFE dispersion, etc., the electrode production cost is high. In addition, the mixture of hydrophilic parts and hydrophobic parts is not always in a desirable state from the standpoint of obtaining electrodes having satisfactory performance. There has further been a problem that control is difficult.

In this process for producing a gas diffusion electrode, the hydrophobic carbon black has been dispersed to about several micrometers in the aqueous solution containing a surfactant even though it has undergone a dispersion treatment. With this dispersion is mixed a PTFE dispersion having an average particle diameter of 0.3 $\mu$m. From the resultant mixture, a reaction layer is produced through aggregation, filtration, sheet formation, etc. As long as the hydrophobic carbon black has been dispersed to an average particle diameter of about several micrometers, practically sufficient performance and reproducibility are secured. Although ultrasonic dispersion is the simplest and excellent technique for dispersing the hydrophobic carbon black, it has been difficult to obtain an average particle diameter of 1 $\mu$m or smaller because of the operation.

Consequently, there has been a desire for a gas diffusion electrode production process in which the production is accomplished through simplified steps in a reduced time period and by which the reaction layer of a gas diffusion electrode having a high oxygen-reducing ability can be produced.

In producing a gas diffusion electrode, a hydrophobic carbon black is first dispersed in an aqueous solution containing a surfactant as described above. Although ultrasonic dispersion generally employed as a dispersion technique has been used for dispersing the hydrophobic carbon black in the aqueous solution containing a surfactant so as to reduce the carbon black to primary particles, this technique has a drawback that the result is a widened particle size distribution of from 0.5 to 50 $\mu$m.

Another drawback of the technique described above is that the dispersion cost is high because the horn of the ultrasonic disperser, which is made of titanium, readily wears out due to contact with the hydrophobic carbon black. Fine silver particles in a dry state are less apt to be dispersed in the solution and necessitate a prolonged period for ultrasonic dispersion operation. However, it has been found that when an ultrasonic dispersion operation is conducted over a prolonged period, fine particles become larger far from being reduced. There has been a further problem that since fine silver particles undergo sintering and become larger in a pressing step, it is necessary to use a large amount of silver for securing performance.

When a dispersion containing a hydrophobic carbon black and fine PTFE particles wherein the two kinds of particles have different particle diameters as shown above, i.e., from 20 to 300 $\mu$m and 0.3 $\mu$m, self-organizes to form a reaction layer, this layer is in such a state that large secondary particles of the hydrophobic carbon black each is surrounded by fine PTFE particles having a size about one-tenth the size of the secondary particle to constitute hydrophobic parts. Since the regions of these hydrophobic parts are large, the hydrophilic parts formed by the self-organization of hydrophilic fine particles also are large. As a result, the three-phase zone interfaces, which participate in reactions, are small. Namely, this means that the electrode performance possessed by each material is not exhibited to the ultimate degree.

DISCLOSURE OF THE INVENTION

The invention has been achieved in view of such conventional problems. An object of the invention is to provide a reaction layer material for a gas diffusion electrode which has high performance, is inexpensive, has a long life, and can be produced through simple operations, and to provide a process for producing the same.

Another object of the invention is to provide a reaction layer material for a high-performance gas diffusion electrode by using a PTFE dispersion in combination with a hydrophobic carbon black finely dispersed so as to have nearly the same average particle diameter as the PTFE dispersion to thereby form a larger amount of three-phase zone interfaces, and to provide a process for producing the same.

Still another object of the invention is to provide a process for producing a reaction layer material for a gas diffusion electrode in which fine silver particles as a material for a reaction layer are prevented from sintering and becoming larger during a pressing step.

The present inventor made extensive studies in order to eliminate the problems described above. As a result, it was found that when hydrophilic fine particles, a hydrophobic carbon black, and the fine PTFE particles of a PTFE dispersion are dispersed in water containing a surfactant, the average particle diameter of each particulate ingredient is important. Namely, that the hydrophilic fine particles and the hydrophobic carbon black have an average particle diameter close to that of the PTFE dispersion and have a narrow particle diameter distribution has been found to be necessary for accomplishing the objects.

In order to disperse a carbon black in water containing a surfactant so as to satisfy the requirement given above, the carbon black is lightly dispersed in the surfactant-containing water and this dispersion is highly pressurized with a pump to form two high-speed flows colliding with each other. As a result, the carbon black can be reduced to 1 μm or below so as to have a narrower particle size distribution. It has been found that the dispersion operation can be efficiently accomplished by merely adding a colloidal silver dispersion and a PTFE dispersion to the resultant carbon black dispersion and stirring the mixture, and that a reaction layer material can be produced by finally self-organizing this mixture with an alcohol.

It was also found that in inhibiting the sintering of fine silver particles in a pressing step, it is effective to cause hydrophilic fine particles to coexist with and surround the fine silver particles.

The present inventor has found that the problems described above can be eliminated and the objects given above can be accomplished based on these findings. The invention has thus been achieved.

Furthermore, the inventor has thought that in producing the reaction layer material by that method in which a PTFE dispersion is added and dispersed with stirring and self-organization is finally conducted with an alcohol, the resultant mixture can be sprayed simultaneously with the mixing of the dispersion with the alcohol by controlling the rate of self-organization, so as to finally form a film which has been self-organized with the alcohol. The invention has thus been achieved.

Furthermore, methods therefor were investigated in order to facilitate the formation of a gas feed layer and a reaction layer. For example, since adding a self-organizing agent such as an alcohol to a dispersion of a hydrophilic carbon black and polytetrafluoroethylene (PTFE) causes the dispersed substances to coagulate and self-organize to thereby give a pasty mixture, a gas feed layer can be obtained by applying the pasty mixture to a conductive substrate and drying and heating the coating.

Incidentally, the mixture produced by the method described above through self-organization with an alcohol comes to have a curdlike consistency because of the high cohesive force of the PTFE. Application with a spatula is hence the only technique for forming the mixture into a film.

The film-forming technique which involves the film-forming operation in which the mixture obtained through filtration which has undergone self-organization with an alcohol and come to have a curdlike consistency is applied with a spatula to form a film has had a drawback that the step is complicated and delicate.

It has therefore been desired to simplify the film-forming technique for gas diffusion electrodes.

The present inventor made various investigations on means therefor. As a result, the inventor has thought that since the mixture which has undergone self-organization with a self-organizing agent such as an alcohol by the method described above comes, with the lapse of time, to have a curdlike consistency and be difficult to be formed into a film, the mixture can be sprayed by controlling the rate of self-organization. Namely, the inventor has had the idea that a film which has been self-organized with an alcohol is finally obtained in this manner. As a result of investigations on means for enabling it, the invention has been achieved.

The invention has eliminated the problems described above by the following means.

1. A reaction layer material for a gas diffusion electrode, which is obtained by mixing a polytetrafluoroethylene dispersion with a surfactant-containing aqueous solution containing hydrophilic fine particles and a hydrophobic carbon black, each dispersed therein satisfying the relationships: $0.5<D<2$ and $r_s<2r_p$, wherein $D=r_c/r_p$, $r_s$ represents the average particle diameter of the hydrophilic fine particles dispersed in the surfactant-containing aqueous solution, $r_c$ represents the average particle diameter of the hydrophobic carbon black dispersed in the surfactant-containing aqueous solution, and $r_p$ represents the average particle diameter of polytetrafluoroethylene fine particles in the polytetrafluoroethylene dispersion to be used; and then adding a self-organizing agent to the mixture and mixing therewith.

2. A process for producing a reaction layer material for a gas diffusion electrode, which comprises, for dispersing a hydrophobic carbon black and/or hydrophilic fine particles and a polytetrafluoroethylene dispersion with a surfactant-containing aqueous solution:

mixing a hydrophobic carbon black and/or hydrophilic fine particles with a surfactant-containing aqueous solution to be dispersed therein satisfying the relationships: $0.5<D<2$ and $r_s<2r_p$, wherein $D=r_c/r_p$, $r_s$ represents the average particle diameter of the hydrophilic fine particles dispersed in the surfactant-containing aqueous solution, $r_c$ represents the average particle diameter of the hydrophobic carbon black dispersed in the surfactant-containing aqueous solution, and $r_p$ represents the average particle diameter of polytetrafluoroethylene fine particles in the polytetrafluoroethylene dispersion to be used;

mixing the resultant dispersion with the polytetrafluoroethylene dispersion having the average particle diameter $r_p$; and then adding a self-organizing agent to the mixture and mixing therewith.

3. The process for processing a reaction layer material for a gas diffusion electrode according to process 1 or 2 above, wherein the hydrophobic carbon black is added to the surfactant-containing aqueous solution and dispersed therein so as to have an average particle diameter thereof of 2 to 0.2 µm, and thereafter a dispersion of the hydrophilic fine particles and the polytetrafluoroethylene dispersion to the resultant dispersion to be mixed therewith, and further the self-organizing agent is added to the mixture to be mixed therewith.

4. The process for processing a reaction layer material for a gas diffusion electrode according to process 1 or 2 above, wherein the hydrophilic fine particles are added to the surfactant-containing aqueous solution and dispersed therein so as to have an average particle diameter thereof of 2 to 0.2 µm, and thereafter the polytetrafluoroethylene dispersion is added to the resultant dispersion to be mixed therewith, and further the self-organizing agent is added to the mixture to be mixed therewith.

5. The process for processing a reaction layer material for a gas diffusion electrode according to process 1 or 2 above, wherein the hydrophobic carbon black is added to the surfactant-containing aqueous solution and dispersed therein using a jet mill so as to have an average particle diameter thereof of 2 to 0.2 µm, and thereafter a colloidal silver dispersion is added to the resultant dispersion to be mixed therewith, subsequently hydrophilic fine particles other than silver are added to the mixture to be mixed therewith, and further the self-organizing agent is added to the mixture to be mixed therewith.

6. The process for processing a reaction layer material for a gas diffusion electrode, which comproises spray-drying a reaction layer material for a gas diffusion electrode as obtained by a process described above.

7. A process for producing a reaction layer material for a gas diffusion electrode, which comprises:

adding a hydrophobic carbon black to a surfactant-containing aqueous solution and dispersing the hydrophobic carbon black therein so as to have an average particle diameter thereof of 2 to 0.2 µm;

adding a dispersion of hydrophilic fine particles and a polytetrafluoroethylene dispersion to the resultant dispersion and mixing therewith; and adding a self-organizing agent to the mixture and mixing therewith.

8. The process for processing a reaction layer material for a gas diffusion electrode, which comprises:

added hydrophilic fine particles to a surfactant-containing aqueous solution and dispersed the hydrophilic fine particles therin so as to have an average particle diameter thereof of 2 to 0.2 µm;

adding a polytetrafluoroethylene dispersion to the resultant dispersion to be mixed therewith; and adding a self-organizing agent to the mixture and mixed therewith.

9. A process for producing a gas diffusion electrode, which comprises:

feeding two fluids through pipes, one of the fluids being a dispersion containing hydrophilic fine particles having a primary-particle diameter of 0.5 µm or smaller, a surfactant and polytetrafluoroethylene fine particles having a primary-particle diameter of 0.5 µm or smaller, and the other fluid being a liquid for self-organization;

causing the two fluids to meet and mix each other; and spraying the mixture to form a coated film to thereby form a reaction layer.

10. A process for producing a gas diffusion electrode, which comprises:

feeding two fluids through pipes, one of the fluids being a dispersion containing hydrophobic carbon black fine particles having a primary-particle diameter of 0.5 µm or smaller, hydrophobic carbon black fine particles having a primary-particle diameter of 0.5 µm or smaller, a surfactant and polytetrafluoroethylene fine particles having a primary-particle diameter of 0.5 µm or smaller, and the other fluid being a liquid for self-organization;

causing the two fluids to meet and mix each other; and spraying the mixture to form a coated film to thereby form a reaction layer.

In item 9 above, fine catalyst particles having a primary-particle diameter of 0.5 µm or smaller can be used as the hydrophilic fine particles. In this case, a reaction layer can be formed because the fine catalyst particles are contained.

Furthermore, a gas diffusion electrode can be produced by forming a gas feed layer on a conductive support such as a silver gauze by the method described in item 10 above and forming a reaction layer thereon by the method described in item 9 above. This sequence of coating film formation may be reversed.

For heightening the performance of a gas diffusion electrode, it is essential to form a larger amount of three-phase zone interfaces. The present inventor made intensive investigations in order to accomplish this subject and, as a result, it has been found that methods for forming a larger amount of three-phase zone interfaces are considerably influenced by the state of the mixture of a hydrophobic carbon black and fine PTFE particles. Namely, it has been found that submicron three-phase zone interfaces are formed by dispersing a hydrophobic carbon black to almost the same particle diameter as a PTFE dispersion to be used, mixing the carbon black dispersion and hydrophilic fine particles having a smaller particle diameter than the PTFE dispersion with the PTFE dispersion with stirring, and then self-organizing the resultant mixture with an alcohol or the like. Namely, the inventor has found a method for constituting three-phase zone interfaces with hydrophilic parts not larger than 1 µm. In this method, materials respectively serving as hydrophilic parts and hydrophobic parts are dispersed in an aqueous solution containing a surfactant to almost the same particle diameter as a PTFE dispersion and the resultant mixture is self-organized, whereby a microstructure can be produced.

Specifically, the relationships among those particle diameters is as follows:

$0.5 < D < 2$ $r_s < 2r_p$ wherein $D = r_c/r_p$, $r_s$ represents the average particle diameter of the hydrophilic fine particles dispersed in the surfactant-containing aqueous solution, $r_c$ represents the average particle diameter of the hydrophobic carbon black dispersed in the surfactant-containing aqueous solution, and $r_p$ represents the average particle diameter of polytetrafluoroethylene fine particles in the polytetrafluoroethylene dispersion to be used.

The polytetrafluoroethylene dispersion is mixed with the aqueous solution containing the hydrophilic fine particle and hydrophobic carbon black dispersed therein under these conditions. Thereafter, a self-organizing agent is further mixed therewith to obtain a reaction layer material for gas diffusion electrodes.

In order to make each of these finely particulate materials have an average particle diameter satisfying those requirements in the invention, it is necessary to regulate the average particle diameter of the hydrophobic carbon black and that of the hydrophilic fine particles so as to satisfy those requirements because the average particle diameter of the fine PTFE particles in the PTFE dispersion to be used has been already fixed by the manufacturer. Since the primary particles of the hydrophobic carbon black have aggregated as stated above, it is preferred to disperse the carbon black in such a manner that the carbon black is finely reduced so as to be free from the aggregated state and have an average particle diameter satisfying the requirements shown above.

An example of means therefor is as follows. A hydrophobic carbon black is lightly dispersed in water containing 4% surfactant. Using a jet mill, high-speed flows from two nozzles having a diameter of 0.2 mm were collided with each other at a pressure of 1,000 kg/cm$^2$ to thereby disperse the carbon black to an average particle diameter of 0.45 $\mu$m. A dispersion operation is accomplished by merely mixing a colloidal silver dispersion having an average particle diameter of 0.1 $\mu$m with the resultant carbon black dispersion with stirring and further mixing a PTFE dispersion therewith with stirring. Finally, ethyl alcohol is mixed with the mixture to self-organize it. The resultant mixture is filtered, dried, and formed into a sheet by the rolling method. The surfactant is removed and the sheet is dried. Thereafter, this sheet, a silver gauze, and a gas fed layer are put together and hot-pressed to obtain a gas diffusion electrode.

In the case where the surfactant concentration in the water and the pressure produced with the water jet mill were regulated to 5% and 500 kg/cm$^2$, respectively, the carbon black was dispersed to an average particle diameter of 0.7 $\mu$m. Consequently, a given average particle diameter can be obtained by suitably fixing the conditions.

The hydrophilic fine particles to be used are preferably ones which do not dissolve in water or alcohols and are stable at a temperature as high as 380° C., such as, e.g., a hydrophilic carbon black, fine metal particles, metal oxides, $ZrO_2$, $CaCO_3$, alumina, silica, titania, or the like. The hydrophilic fine particles are used after platinum or silver is deposited thereon as a catalyst. These fine particles desirably have a particle diameter of 0.3 $\mu$m or smaller.

The hydrophilic fine particles added in the invention in order to prevent fine silver particles from sintering in a pressing step are desirably ones having a particle diameter of 0.1 $\mu$m or smaller. The material of these particles needs to be one which does not dissolve in water or alcohols and is stable at a temperature as high as 380° C., approximately corresponding to a pressing temperature, such as, e.g., $ZrO_2$, $CaCO_3$, alumina, silica, titania, or the like. When these hydrophilic fine particles coexist, the fine silver particles are inhibited from sintering and the decrease in silver surface area is reduced to or below one-third the decrease in the case of the absence of hydrophilic fine particles. Consequently, the amount of fine silver particles to be used can be reduced accordingly.

Next, the process of the invention for producing a gas diffusion electrode material or the process of the invention for producing a gas diffusion electrode each employing the spraying method may be applied to either or both of the reaction layer and gas feed layer of a gas diffusion electrode. In the case of producing a gas diffusion electrode by mainly forming a reaction layer only and forming a gas feed layer which need not especially be self-organized, the reaction layer only may be produced according to the invention.

Several methods can be used for forming a reaction layer. For example, in a method in which layer formation is followed by catalyst deposition to form a reaction layer, a hydrophilic carbon black and a hydrophobic carbon black are first dispersed with a surfactant, e.g., Triton, and a PTFE dispersion is further added to obtain a reaction layer dispersion.

In the case of a method in which a reaction layer containing fine catalyst particles is formed through one operation, this can be accomplished by self-organizing a liquid dispersion of, e.g., a mixture of fine silver particles and a PTFE dispersion with a self-organizing agent, e.g., an alcohol such as ethanol, and immediately spraying the dispersion.

After the mixing, the dispersion is self-organized. Consequently, the dispersion being sprayed is in a self-organized state. However, there are cases where with the lapse of time after the mixing, the dispersion comes to have a curdlike consistency and becomes unable to be sprayed. It is therefore preferred to conduct spraying as early as possible after the mixing. However, in the case where the concentration is low, spraying may be possible according to conditions because the dispersion as a whole does not come to have a curdlike consistency.

Figure 1:
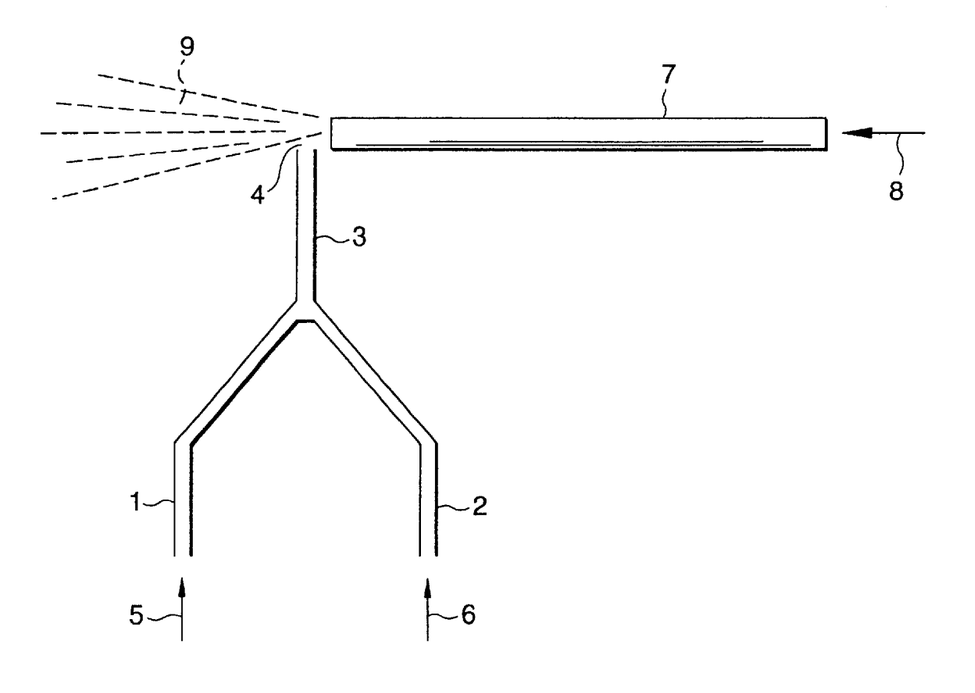
FIG. 1 is a diagrammatic view illustrating the formation of a spray in the invention.

For example, the spraying of a reaction layer dispersion is explained below in detail by reference to the drawing. As shown in FIG. 1, a reaction layer dispersion 5 is introduced into a feed pipe 1 connected to a spray nozzle, while ethanol 6 is introduced into a feed pipe 2. The two liquids are caused to meet each other in a confluence passageway 3. This liquid mixture is discharged from the tip of a nozzle 4, during which a high-pressure gas 8 is jetted from a jet gas pipe 7. As a result, the discharged liquid is blown off to form a spray 9. This spray 9 is applied to an electrode substrate, whereby a coating film can be formed.

The preparation of, for example, a reaction layer dispersion in a process of the invention for producing a gas diffusion electrode is explained in detail. First, fine silver particles as a catalyst or a hydrophilic carbon black is added to and dispersed in an aqueous solution containing, e.g., a surfactant. Alternatively, a surfactant is added to fine silver particles or a hydrophilic carbon black and the mixture is dispersed in water. Thereafter, a PTFE dispersion is mixed therewith and dispersed. In the dispersion thus obtained, the fine particles of the silver or hydrophilic carbon black and the fine PTFE particles retain a highly dispersed stable state while forming micellar structures by the action of the surfactant.

In this dispersed state, the dispersed particles, which each is an aggregate of primary particles, have an average particle diameter of 5 $\mu$m or smaller. The fine catalyst particles and the fine particles of the hydrophilic carbon black preferably have an average primary-particle diameter of 1 $\mu$m or smaller, especially 0.5 $\mu$m or smaller. Because of spraying, finer particles are preferred from the standpoint of avoiding problems such as nozzle clogging.

In the same manner, a hydrophobic carbon black or the like can be dispersed as a constituent material.

Namely, a hydrophilic carbon black and a hydrophobic carbon black are added to water and a surfactant to disperse the carbon blacks in the water. After fine PTFE particles are mixed therewith, the ability of the surfactant is controlled, whereby a reaction layer dispersion can be prepared which contains the hydrophilic carbon black dispersed together with fine PTFE particles and further contains the hydrophobic carbon black dispersed together with fine PTFE particles.

In the case of fine silver particles and fine PTFE particles, it is preferred to disperse these particles with a surfactant, e.g., Triton.

The main constituent materials of a reaction layer include a catalyst comprising a noble metal such as platinum, a mixture of fine hydrophilic carbon particles and fine water-repellent carbon particles, and a small amount of fine fluororesin particles, and optionally include binder particles for bonding these fine particles to one another.

Examples of the catalyst include alkali-resistant noble metals, e.g., platinum and other platinum group metals, gold, and silver, and alloys of these noble metals. However, the catalyst should not be construed as being limited to these. When both performance and cost are taken in account, silver is a preferred catalyst. These noble metals are used in the form of fine particles.

The main constituent materials of a gas feed layer include fine water-repellent carbon particles and fine fluororesin particles, and optionally include binder particles for bonding these fine particles to one another.

The surfactant used for dispersion in the production of a gas diffusion electrode of the invention can be any of an anionic surfactant, cationic surfactant, nonionic surfactant, and amphoteric surfactant. However, a nonionic surfactant is preferred in that it does not influenced by salts or ions.

Examples of the fluororesin include tetrafluoroethylene resins, chlorotrifluoroethylene resins, tetrafluoroethylene/hexafluoropropylene resins, and vinylidene fluoride resins. However, tetrafluoroethylene resins (PTFE) are especially preferred.

The PTFE dispersion is an aqueous dispersion of fine PTFE particles. Although a surfactant for dispersion is contained in the dispersion, this surfactant is preferably a nonionic surfactant for the reason described above.

The self-organizing agent added to the dispersion can be called "micelle destroyer" because it functions to destroy dispersed micelles. Examples of this micelle destroyer include highly water-soluble organic solvents, e.g., alcohols such as methyl alcohol, ethyl alcohol, isopropyl alcohol, and the like and ketones such as acetone and the like. These micelle destroyers may be used in such an amount that the micellar structures which are units of surfactant molecules are destroyed to thereby come into a fractal state. However, the proportion of the micelle destroyer to the dispersion is usually 1:1, but may be a value therearound.

By adding an alcohol to the dispersion, the micellar structures enabling the fine particles to be dispersed are destroyed and the fine particles are aggregated. In this case, aggregates in a fractal state are formed and, as a result, a hydrophilic layer in a fractal state is formed. The alcohol functions as a micelle destroyer.

In a dispersion containing a hydrophobic carbon black or the like dispersed therein as a constituent material, the hydrophobic parts also are aggregated by an alcohol. In this case, however, the hydrophobic parts are regulated so as to give smaller aggregates than the hydrophilic parts. When the hydrophilic layer and hydrophobic parts thus obtained are mixed with each other, the hydrophobic aggregates in the range of from 5 to 100 $\mu$m penetrate into the peripheries of the hydrophilic aggregates each having a fractal structure in the range of from 5 to 100 $\mu$m, whereby the interfaces between the hydrophobic parts and the hydrophilic parts have a huge area. In usual cases, hydrophilic aggregates are larger than hydrophobic aggregates. As a result, improved performance is obtained simultaneously with an increased electrode life.

In the case of fine silver particles and fine PTFE particles, these particles are dispersed with a surfactant, e.g., Triton, and ethanol is added to the dispersion. As a result, the fine silver particles and the fine PTFE particles separately aggregate into fractals of about several micrometers, and these fractals undergo secondary aggregation.

According to the invention, a mixture obtained by mixing an alcohol serving as a self-organizing agent with the material dispersion with stirring is powdered by feeding the mixture to a spray dryer, spraying the same, and drying the resultant droplets in the air. Thus, a reaction layer material powder or a gas feed layer material powder can be obtained.

Alternatively, a method may be used which comprises continuously introducing the material dispersion and an alcohol serving as a self-organizing agent with respective constant delivery pumps into a mixing part, mixing the two liquids together to self-organize the dispersion, subsequently sending the mixture to a spray drying part, spraying the mixture, and drying the resultant droplets in the air to obtain a powder. In this case, it is preferred to spray the mixture at a stage in which its viscosity is still not so high, because gelation proceeds with the progress of self-organization, resulting in a considerably high viscosity.

Embodiments of the invention include the preparation of a reaction layer material powder and of a gas feed layer material powder.

A reaction layer material powder is prepared, for example, in the following manner. A hydrophilic carbon black and a hydrophobic carbon black are dispersed in an aqueous solution of Triton (surfactant) to obtain a dispersion. A PTFE dispersion is further added thereto to obtain a dispersion. A mixture of fine silver particles and a PTFE dispersion or the like is added to the thus-obtained dispersion and dispersed therein to obtain a reaction layer dispersion in a liquid form. An alcohol such as, e.g., ethanol is added to the thus-obtained dispersion to self-organize the dispersion, which is then spray-dried.

A gas feed layer material powder is prepared, for example, in the following manner. A hydrophobic carbon black is dispersed with Triton to obtain a dispersion. A PTFE dispersion is further added thereto to prepare a dispersion. Ethanol serving as a self-organizing agent is added to the thus-obtained dispersion, and the resultant mixture is treated with a mixer and spray-dried.

The self-organizing agent preferably is ethanol, isopropyl alcohol, or the like. It may be an aqueous solution of an inorganic salt such as common salt, sodium carbonate, alum, or the like.

BEST MODE FOR CARRYING OUT THE INVENTION

The invention will be explained below in detail by reference to the following Examples. However, the invention should not be construed as being limited only to these Examples. Throughout the Examples, all "parts" means "parts by weight" and all "%" means "% by weight".

EXAMPLE 1

To 200 parts of 4% Triton (surfactant; the same applies hereinafter) was added 2 parts of a hydrophobic carbon black (Denka Black; average particle diameter, 390 Å; manufactured by Denki Kagaku Kogyo K.K.). The mixture was stirred to disperse the carbon black. This carbon black dispersion was treated five times with a jet mill (manufactured by Genus; nozzle diameter, 0.2 mm) at a pressure of 1,500 kg/cm². As a result, the dispersion came to have an average particle diameter of 0.4 μm and a narrow distribution having no particles of 1 μm or larger. To this high-degree dispersion was added 10 parts of a silver colloid (a trial product manufactured by Tanaka Kikinzoku Kogyo K.K.; average particle diameter, 0.1 μm). The mixture was stirred for mixing. Thereto was further added 1.5 parts of a PTFE dispersion (D-1; average particle diameter, 0.3 μm; manufactured by Daikin Industries, Ltd.). This mixture was stirred for mixing. To this dispersion was added 300 parts of isopropyl alcohol to self-organize the dispersion. The resultant mixture was filtered to obtain a reaction layer material.

A gas diffusion electrode sheet composed of a reaction layer and a gas feed layer was produced by the rolling method. This sheet was dried at 80° C. for 3 hours and the surfactant was removed with an ethanol extractor. After drying, the sheet was pressed together with a silver gauze at 50 kg/cm² and 350° C. for 60 seconds to obtain an electrode. The oxygen-reducing ability of this electrode was measured at 80° C. in 32% NaOH. As a result, the ability was found to be as high as 0.846 V (vs. RHE) at 30 A/dm².

COMPARATIVE EXAMPLE 1

To 200 parts of 4% Triton was added 2 parts of a hydrophobic carbon black (Denka Black; average particle diameter, 390 Å; manufactured by Denki Kagaku Kogyo K.K.). The mixture was stirred to disperse the carbon black. This carbon black dispersion was treated with an ultrasonic disperser (manufactured by Branson; 500 W) for 5 minutes with cooling with water. As a result, the dispersion came to have an average particle diameter of 1.6 μm. To this dispersion was added 10 parts of a silver colloid (a trial product manufactured by Tanaka Kikinzoku Kogyo K.K.; average particle diameter, 0.1 μm). The mixture was stirred for mixing. Thereto was further added 1.5 parts of a PTFE dispersion (D-1; average particle diameter, 0.3 μm; manufactured by Daikin Industries, Ltd.). This mixture was stirred for mixing. To this dispersion was added 300 parts of isopropyl alcohol to self-organize the dispersion. The resultant mixture was filtered to obtain a reaction layer material.

A gas diffusion electrode sheet composed of a reaction layer and a gas feed layer was produced by the rolling method. This sheet was dried at 80° C. for 3 hours and the surfactant was removed with an ethanol extractor. After drying, the sheet was pressed together with a silver gauze at 50 kg/cm² and 350° C. for 60 seconds to obtain an electrode. The oxygen-reducing ability of this electrode was measured at 80° C. in 32% NaOH. As a result, the ability was found to be as low as 0.793 V (vs. RHE) at 30 A/dm².

EXAMPLE 2

To 350 parts of 2% Triton were added 7 parts of a hydrophilic carbon black (AB-12; average particle diameter, 400 Å; trial product; manufactured by Denki Kagaku Kogyo K.K.) and 3 parts of a hydrophobic carbon black (No. 6; average particle diameter, 500 Å; trial product; manufactured by Denki Kagaku Kogyo K.K.). The mixture was stirred to disperse the carbon blacks. This carbon black dispersion was treated five times with a jet mill (manufactured by Genus; nozzle diameter, 0.2 mm) at a pressure of 1,500 kg/cm². As a result, the dispersion came to have an average particle diameter of 0.45 μm. Thereto was further added 4 parts of a PTFE dispersion (D-1; average particle diameter, 0.3 μm; manufactured by Daikin Industries, Ltd.). This mixture was stirred for mixing. To this dispersion was added 300 parts of isopropyl alcohol to self-organize the dispersion. The resultant mixture was filtered to obtain a reaction layer material.

A gas diffusion electrode sheet composed of a reaction layer and a gas feed layer was produced by the rolling method. This sheet was dried at 80° C. for 3 hours and the surfactant was removed with an ethanol extractor. After drying, the sheet was pressed together with a silver gauze at 50 kg/cm² and 380° C. for 60 seconds to obtain an electrode. Platinum was deposited on this electrode in an amount of 0.56 mg/cm² by the coating method. The oxygen-reducing ability of this electrode was measured at 80° C. in 32% NaOH. As a result, the ability of the electrode obtained was found to be as extremely high as 0.850 V (vs. RHE) at 30 A/dm².

COMPARATIVE EXAMPLE 2

To 350 parts of 2% Triton were added 7 parts of a hydrophilic carbon black (AB-12; average particle diameter, 400 Å; trial product; manufactured by Denki Kagaku Kogyo K.K.) and 3 parts of a hydrophobic carbon black (No. 6; average particle diameter, 500 Å; trial product; manufactured by Denki Kagaku Kogyo K.K.). The mixture was stirred to disperse the carbon blacks. This carbon black dispersion was treated with an ultrasonic disperser (manufactured by Branson; 500 W) for 5 minutes with cooling with water. As a result, the dispersion came to have an average particle diameter of 1.5 μm. Thereto was further added 4 parts of a PTFE dispersion (D-1; average particle diameter, 0.3 μm; manufactured by Daikin Industries, Ltd.). This mixture was stirred for mixing. To this dispersion was added 300 parts of isopropyl alcohol to self-organize the dispersion. The resultant mixture was filtered to obtain a reaction layer material.

A gas diffusion electrode sheet composed of a reaction layer and a gas feed layer was produced by the rolling method. This sheet was dried at 80° C. for 3 hours and the surfactant was removed with an ethanol extractor. After drying, the sheet was pressed together witgh a silver gauze at 50 kg/cm² and 380° C. for 60 seconds to obtain an electrode. Platinum was deposited on this electrode in an amount of 0.56 mg/cm² by the coating method. The oxygen-reducing ability of this electrode was measured at 80° C. in 32% NaOH. As a result, the ability was found to be as low as 0.80 V (vs. RHE) at 30 A/dm².

EXAMPLE 3

To 200 parts of 6% Triton was added 2 parts of a hydrophobic carbon black (No. 6; average particle diameter, 500 Å; trial product; manufactured by Denki Kagaku Kogyo K.K.). The mixture was stirred to disperse the carbon black. This carbon black dispersion was treated once with a jet mill (manufactured by Genus; nozzle diameter, 0.2 mm) at a pressure of 500 kg/cm². As a result, the dispersion came to have an average particle diameter of 0.76 μm and a narrow distribution having no particles of 10 μm or larger. To this high-degree dispersion was added 10 parts of a silver colloid (a trial product manufactured by Tanaka Kikinzoku Kogyo K.K.; average particle diameter, 0.1 μm). The mixture was stirred for mixing. Thereto was further added 1.5 parts of PTFE dispersion D-1 (manufactured by Daikin Industries, Ltd.). This mixture was stirred for mixing. To this dispersion was added 300 parts of isopropyl alcohol to self-organize the dispersion. The resultant mixture was filtered to obtain a reaction layer material.

A gas feed layer dispersion produced from 2 parts of a hydrophobic carbon black (No. 6; average particle diameter, 500 Å; trial product; manufactured by Denki Kagaku Kogyo K.K.) and 1.4 parts of a PTFE dispersion (D-1; manufactured by Daikin Industries, Ltd.) was self-organized with isopropyl alcohol. This mixture was filtered to obtain a gas feed layer material powder.

A gas diffusion electrode sheet was produced from the reaction layer material and the gas feed layer material powder by the rolling method. This sheet was dried at 80° C. for 3 hours and the surfactant was removed with an ethanol extractor. After drying, the sheet was pressed together with a silver gauze at a pressure of 50 kg/cm$^2$ and 350° C. for 60 seconds to obtain a gas diffusion electrode.

This electrode was attached as an oxygen cathode to a small electrolytic cell for common-salt electrolysis, and a hydrogen generation treatment was conducted for 10 minutes under the conditions of 80° C., 32% NaOH, and 30 A/dm$^2$. Thereafter, continuous operation was conducted under the conditions of 85° C., 32% NaOH, and 30 A/dm$^2$ while introducing oxygen in an amount of 1.6 times the theoretical amount. The initial electrolytic voltage was 2.0 V. Thereafter, the voltage has remained almost constant at about 2.0 V for a half year. At present, the operation is continuing.

EXAMPLE 4

To 200 parts of 6% Triton was added 2 parts of a hydrophobic carbon black (No. 6; average particle diameter, 500 Å; trial product; manufactured by Denki Kagaku Kogyo K.K.). The mixture was stirred to disperse the carbon black. This carbon black dispersion was treated three times with a jet mill (manufactured by Genus; nozzle diameter, 0.2 mm) at a pressure of 500 kg/cm$^2$. As a result, the dispersion came to have an average particle diameter of 0.64 μm. To this high-degree dispersion was added 4 parts of a silver colloid (a trial product manufactured by Tanaka Kikinzoku Kogyo K.K.; average particle diameter, 0.1 μm). The mixture was stirred for mixing. In this dispersion were dispersed 5 parts of fine zirconia particles having an average particle diameter of 0.05 μm. Thereto was further added 1.5 parts of a PTFE dispersion (D-1; manufactured by Daikin Industries, Ltd.). This mixture was stirred for mixing. To this dispersion was added 300 parts of isopropyl alcohol to self-organize the dispersion. The resultant mixture was filtered to obtain a reaction layer material.

A gas feed layer dispersion produced from 2 parts of a hydrophobic carbon black (No. 6; average particle diameter, 500 Å; trial product; manufactured by Denki Kagaku Kogyo K.K.) and 1.4 parts of a PTFE dispersion (D-1; manufactured by Daikin Industries, Ltd.) was self-organized with isopropyl alcohol. This mixture was filtered to obtain a gas feed layer material.

A gas diffusion electrode sheet was produced by the rolling method. This sheet was dried at 80° C. for 3 hours and the surfactant was removed with an ethanol extractor. After drying, this sheet was pressed together with a silver gauze at 50 kg/cm$^2$ and 380° C. for 60 seconds to obtain an electrode.

This electrode was attached as an oxygen cathode to a small electrolytic cell for common-salt electrolysis, and a hydrogen generation treatment was conducted for 10 minutes under the conditions of 80° C., 32% NaOH, and 30 A/dm$^2$. Thereafter, continuous operation was conducted under the conditions of 85° C., 32% NaOH, and 30 A/dm$^2$ while introducing oxygen in an amount of 1.6 times the theoretical amount. The initial electrolytic voltage was 2.05 V. Thereafter, the voltage has remained almost constant at about 2.0 V for a half year. At present, the operation is continuing.

EXAMPLE 5

In 1 liter of an aqueous solution were dispersed 20 g of fine zirconia particles having an average particle diameter of 0.15 μm with the aid of 100 ml of 20% Triton added thereto. To this dispersion were dropwise added, over 1 hour, 70 ml of 35% formalin and 250 ml of a solution prepared by dissolving 35 g of silver nitrate in water with cooling. The pH of this dispersion was adjusted to 9 by adding caustic soda to thereby deposit silver on the fine zirconia particles.

To 4 parts of the fine zirconia particles having silver deposited thereon were added 1 part of Triton and 9 parts of water. The particles were dispersed with an ultrasonic disperser. Thereto was added 1 part of a PTFE dispersion (D-1; manufactured by Daikin Industries, Ltd.). This mixture was stirred for mixing to prepare a reaction layer dispersion.

This reaction layer dispersion was introduced through one pipe for spraying, and ethanol was sent through another pipe. The two liquids were caused to meet and mix with each other in one passageway. The resultant mixture was immediately applied by spraying on a silver-plated nickel foam (12×28 cm square) in a thickness of 0.3 mm. This coated foam was pressed at a pressure of 10 kg/cm$^2$ to force the coating into the foam and thereby form a reaction layer.

Furthermore, a pasty mixture obtained by adding ethanol to a dispersion of a PTFE dispersion (D-1; manufactured by Daikin Industries, Ltd.) was forced into the back side of the foam to form a gas diffusion layer. This coated foam was dried at 80° C. for 3 hours, pressed at ordinary temperature and a pressure of 40 kg/cm$^2$ for 60 seconds, heat-treated at 250° C. for 10 minutes, and then cooled to obtain an electrode.

The oxygen-reducing ability of this electrode was measured. As a result, the ability was found to be as high as 0.80 V (vs. RHE) at a current density of 30 A/dm$^2$.

EXAMPLE 6

2.5 Parts of a hydrophilic carbon black having 10% silver deposited thereon (AB-12; average particle diameter, 400 Å; trial product; manufactured by Denki Kagaku Kogyo K.K.) and 1 part of PTFE dispersion D-1 (manufactured by Daikin Industries, Ltd.) are dispersed. Fifty parts of isopropyl alcohol was added to this dispersion to self-organize the dispersion.

This mixture is sprayed on a 50-ppi silver-plated nickel foam in a thickness of 200 μm, and the coated foam is rolled together with a silicone sheet having a thickness of 1 mm to thereby force the reaction layer into the nickel foam.

A gas feed layer dispersion produced from 2 parts of a hydrophobic carbon black (No. 6; average particle diameter, 500 Å; trial product; manufactured by Denki Kagaku Kogyo K.K.) and 1 part of PTFE dispersion D-1 (manufactured by Daikin Industries, Ltd.) was caused to meet isopropyl alcohol and was thus self-organized. This mixture was sprayed on the back side of the nickel foam having the reaction layer formed thereon. Thus, a gas feed layer was formed.

The coated foam was dried at 80° C. for 3 hours and the surfactant was removed with an ethanol extractor. After drying, the coated foam was pressed at 50 kg/cm$^2$ and 380° C. for 60 seconds to obtain an electrode.

The oxygen-reducing ability of this electrode was measured. As a result, the ability was found to be as high as 0.81

V (vs. RHE) at a current density of 30 A/dm$^2$. This performance was higher by 20 mV than that of an electrode produced by the conventional method comprising coagulating a dispersion by freezing.

EXAMPLE 7

To 5 parts of fine silver particles (manufactured by Mitsui Mining et Smelting Co., Ltd.; average particle diameter, 0.3 µm; Ag-3030) was added 2 parts of PTFE dispersion D-1 (manufactured by Daikin Industries, Ltd.). This mixture was stirred for mixing. The resultant reaction layer dispersion was caused to meet ethanol, and the mixture was applied by spraying on a silver-plated nickel foam (12×28 cm square) in a thickness of 0.5 mm. This coated foam was pressed at a pressure of 10 kg/cm$^2$ to force the coating into the silver-plated nickel foam and thereby form a reaction layer.

Furthermore, PTFE dispersion D-1 (manufactured by Daikin Industries, Ltd.) and ethanol were caused to meet each other and simultaneously sprayed on the back side of the nickel foam to form a gas feed layer.

The coated foam was dried at 80° C. for 3 hours and the surfactant was removed with an ethanol extractor. Thereafter, the coated foam was dried at 100° C. for 2 hours and a silicone resin sheet was superposed thereon on the gas feed layer side. This assemblage was pressed at ordinary temperature and 40 kg/cm$^2$ for 60 seconds, heat-treated at 250° C. for 10 minutes without applying a pressure, and then cooled to obtain an electrode.

An electrolytic cell for common-salt electrolysis was fabricated in which the gap between the electrode and an ion-exchange membrane was zero. This cell was continuously operated. As a result, the electrolytic cell voltage was 2.01 V under the conditions of a current density of 30 A/dm$^2{}_2$, a temperature of 90° C., a target caustic soda concentration of 32% NaOH, and an oxygen feed rate of 2 times the theoretical amount. The operation could be continued for 40 days without undergoing fluctuations of voltage. The electrolysis is continuing.

EXAMPLE 8

To 2 parts of a hydrophobic carbon black (No. 6; average particle diameter, 500 Å; trial product; manufactured by Denki Kagaku Kogyo K.K.) was added 20 parts of 20% Triton to disperse the carbon black. Thereafter, 1.2 parts of a PTFE dispersion (D-1; manufactured by Daikin Industries, Ltd.) was added and dispersed. This dispersion and acetone as two liquids were caused to meet and mix with each other to self-organize the dispersion. During the self-organization, the resultant mixture was sprayed to form a gas feed layer having a thickness of 400 µm on a 50-mesh silver gauze.

Furthermore, to silver, 3 parts of a hydrophilic carbon black (AB-12; average particle diameter, 400 Å; trial product; manufactured by Denki Kagaku Kogyo K.K.) and 2 parts of a hydrophobic carbon black (No. 6; average particle diameter, 500 Å; trial product; manufactured by Denki Kagaku Kogyo K.K.), 20 parts of 20% Triton was added and the mixture was dispersed, and then 3 parts of a PTFE dispersion (D-1; manufactured by Daikin Industries, Ltd.) was added thereto and the mixture was dispersed.

This dispersion and acetone as two liquids were fed through pipes at the same flow rate and caused to meet and mix with each other to self-organize the dispersion. The resultant mixture was sprayed on the gas feed layer in a thickness of 200 µm to form a reaction layer. For the spraying, nitrogen gas heated to 120° C. was used. The coated silver gauze was dried at 80° C. for 3 hours and treated with an ethanol extractor for 6 hours to remove the surfactant. After drying, the coated silver gauze was pressed at 50 kg/cm$^2$ and 380° C. for 60 seconds to obtain an electrode. Platinum was deposited on the reaction layer in an amount of 0.5 mg/cm$^2$ by applying a chloroplatinic acid solution with suction.

The oxygen-reducing ability of this electrode was measured. As a result, the ability was found to be as high as 0.82 V (vs. RHE) at 30 A/dm$^2$.

A gas diffusion electrode having platinum deposited thereon was simultaneously produced by the conventional method comprising coagulating a dispersion by freezing. As a result, however, the performance was almost the same or slightly high.

EXAMPLE 9

In 1 liter of an aqueous solution were dispersed 20 g of fine zirconia particles having an average particle diameter of 0.15 µm. Thereto were added 35 g of silver nitrate, formalin, and caustic soda to thereby reduce the silver nitrate and deposit the resultant silver to the fine zirconia particles. To 4 parts (by weight; the same applies hereinafter) of the thus-obtained fine zirconia particles having silver deposited thereon are added 1 part of Triton and 9 parts of water. The particles are dispersed with an ultrasonic disperser.

Subsequently, 1 part of a PTFE dispersion (D-1; manufactured by Daikin Industries, Ltd.) is added thereto, and this mixture is stirred for mixing to prepare a reaction layer dispersion.

This reaction layer dispersion and ethanol are introduced into a mixer, whose outlet is connected to the inlet of a spray dryer. The reaction layer dispersion is sprayed and dried to obtain a powder.

On the other hand, in 300 parts of a Triton solution having a concentration of 2% and 10 parts of a PTFE dispersion (D-1; manufactured by Daikin Industries, Ltd.), 18 parts of a hydrophobic carbon black (No. 6; average particle diameter, 500 Å; trial product; manufactured by Denki Kagaku Kogyo K.K.) was dispersed to obtain a gas feed layer dispersion. This gas feed layer dispersion and ethanol were introduced into a mixer, whose outlet was connected to the inlet of a spray dryer. The resultant mixture was sprayed and dried to obtain a powder.

These powders each was kneaded together with solvent naphtha. The resultant mixtures were formed into sheets and superposed on each other by the rolling method to obtain a sheet composed of: a reaction layer and a gas feed layer bonded thereto. The surfactant was removed from this sheet with an ethanol extractor and the sheet was dried at 80° C. for 3 hours.

The dried sheet was pressed together with a silver gauze at a temperature of 380° C. and 50 kg/cm$^2$ for 60 seconds to obtain an electrode.

The oxygen-reducing ability of this electrode obtained was measured. As a result, the ability was found to be as high as 0.80 V (vs. RHE) at a current density of 30 A/dm$^2$.

EXAMPLE 10

To 5 parts of a hydrophilic carbon black (AB-12; average particle diameter, 400 Å; trial product; manufactured by Denki Kagaku Kogyo K.K.) and 2 parts of a hydrophobic carbon black (No. 6; average particle diameter, 500 Å; trial product; manufactured by Denki Kagaku Kogyo K.K.) was added 300 parts of a Triton solution having a concentration of 2%. These were dispersed with a jet mill. Thereto was added 2 parts of a silver colloid (average particle diameter, 0.1 μm; trial product of Tanaka Kikinzoku Kogyo K.K.). The dispersion was stirred together with the silver colloid. Thereto was further added 3 parts of a PTFE dispersion (D-1; manufactured by Daikin Industries, Ltd.). This mixture was stirred to disperse the PTFE dispersion.

This reaction layer dispersion and ethanol were introduced into a mixer, whose outlet was connected to the inlet of a spray dryer. The resultant mixture was sprayed and dried to obtain a powder.

On the other hand, in 300 parts of a Triton solution having a concentration of 2% and 10 parts of a PTFE dispersion (D-1; manufactured by Daikin Industries, Ltd.), 18 parts of a hydrophobic carbon black (No. 6; average particle diameter, 500 Å; trial product; manufactured by Denki Kagaku Kogyo K.K.) was dispersed to obtain a gas feed layer dispersion. This gas feed layer dispersion and ethanol were introduced into a mixer, whose outlet was connected to the inlet of a spray dryer. The gas feed layer dispersion was sprayed and dried to obtain a powder.

These powders each was kneaded together with solvent naphtha. The resultant mixtures were formed into sheets and superposed on each other by the rolling method to obtain a sheet composed of a reaction layer and a gas feed layer bonded thereto.

After this sheet was dried at 80° C. for 3 hours, the surfactant was removed therefrom with an ethanol extractor. After drying, the sheet was pressed together with a silver gauze at a pressure of 50 kg/cm$^2$ and a temperature of 380° C. for 60 seconds to obtain a gas diffusion electrode.

The oxygen-reducing ability of this electrode obtained was measured. As a result, the electrode showed such a high electrolytic performance that the electrolytic voltage was 0.82 V (vs. RHE) at a current density of 30 A/dm$^2$.

INDUSTRIAL APPLICABILITY

According to the invention, a reaction layer material for gas diffusion electrodes which has a larger amount of three-phase zone interfaces was obtained by dispersing a hydrophobic carbon black to a particle diameter almost the same as that of a PTFE dispersion and dispersing hydrophilic fine particles to an average particle diameter smaller than that of the PTFE dispersion. When this reaction layer material is used, a gas diffusion electrode having exceedingly high performance can be produced.

In the invention, a hydrophobic carbon black as a material for a gas diffusion electrode can be easily reduced to a size close to the particle diameter of the PTFE dispersion by dispersing the carbon black with a jet mill. Consequently, a high-performance gas diffusion electrode having an increased amount of three-phase zone interfaces can be obtained.

Moreover, by incorporating hydrophilic particles stable in a pressing step into the reaction layer material beforehand, fine silver particles can be prevented from sintering in the pressing step in electrode production. Thus, a high-performance electrode can be obtained.

According to the invention, a gas diffusion electrode which is inexpensive and has high performance and a long life can be produced through simple electrode production operations.

Furthermore, according to the means of the invention for producing a gas diffusion electrode material powder through spraying, a dispersion such as a reaction layer dispersion can be directly sprayed. Consequently, a reaction layer material powder and/or a gas feed layer material powder for gas diffusion electrodes can be easily produced. The steps were simplified and the productivity was improved. The steps of this production process are neither complicated nor delicate, and a reduction in the period required for production can be attained. The process is especially suitable for the case where a reaction layer powder is obtained using a silver colloid, which requires a prolonged filtration time.

In the invention, a coating layer of a reaction layer material or gas feed layer material dispersion which has been self-organized with a self-organizing agent is obtained through a simple operation, i.e., mere spraying. Consequently, a reaction layer and/or a gas feed layer which each is homogeneous and has high activity and high strength can be obtained. The electrode production steps were simplified and the productivity was increased.

What is claimed is:

1. A method of making a reaction layer material for a gas diffusion electrode, the method comprising the steps of:
dispersing carbon black particles in an aqueous solution that contains a surfactant, the carbon black particles having an average diameter of less than one micron, the carbon black particles aggregating in the aqueous solution to form aggregated carbon black particles having an average diameter greater than the average diameter of the carbon black particles;
breaking down the aggregated carbon black particles in the aqueous solution so that the average diameter of the aggregated carbon black particles is less than one micron;
adding a polytetrafluoroethylene (PTFE) dispersion and a self-organizing agent to the aqueous solution with the broken down aggregated carbon black particles to form the reaction layer material, where a ratio of the average diameter of the broken down aggregated carbon black particles to an average diameter of PTFE particles in the PTFE dispersion is less than two and greater than 0.5.

2. The method of claim 1, wherein the breaking down step comprises the step of directing the aqueous solution with the aggregated carbon black particles from nozzles so that outputs from the nozzles collide and break down the aggregated carbon black particles.

3. The method of claim 1, wherein the adding step comprises the steps of mixing the PTFE dispersion and the aqueous solution with the broken down aggregated carbon black particles to form a first mixture, causing the first mixture to meet the self-organizing agent to form a second mixture, and spraying the second mixture to form the reaction layer material.

4. A method of making a reaction layer material for a gas diffusion electrode, the method comprising the steps of:
providing a polytetrafluoroethylene (PTFE) dispersion having PTFE particles with an average diameter of no more than 0.5 microns;
dispersing carbon black particles in an aqueous solution that contains a surfactant, the carbon black particles having an average diameter of no more than 0.5 microns, the carbon black particles aggregating in the aqueous solution to form aggregated carbon black particles having an average diameter substantially more than the average diameter of the PTFE particles;
breaking down the aggregated carbon black particles in the aqueous solution so that the average diameter of the aggregated carbon black particles is between twice and one-half the average diameter of the PTFE particles;

adding the PTFE dispersion and a self-organizing agent to the aqueous solution with the broken down aggregated carbon black particles to form the reaction layer material.

5. The method of claim 4, wherein the breaking down step comprises the step of directing the aqueous solution with the aggregated carbon black particles from nozzles so that outputs from the nozzles collide and break down the aggregated carbon black particles.

6. The method of claim 4, wherein the adding step comprises the steps of mixing the PTFE dispersion and the aqueous solution with the broken down aggregated carbon black particles to form a first mixture, causing the first mixture to meet the self-organizing agent to form a second mixture, and spraying the second mixture to form the reaction layer material.

* * * * *